United States Patent
Numata

(10) Patent No.: US 6,384,938 B1
(45) Date of Patent: May 7, 2002

(54) FACSIMILE MODULE SELF-DIAGNOSTIC SYSTEM FOR DIGITAL CIRCUIT MULTIPLICATION EQUIPMENT

(75) Inventor: Yoshiaki Numata, Miyagi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/338,168

(22) Filed: Jun. 22, 1999

(30) Foreign Application Priority Data

Jun. 26, 1998 (JP) .......................................... 10-181133

(51) Int. Cl.$^7$ ............................. H04N 1/00; H04J 15/00
(52) U.S. Cl. ...................... 358/406; 358/425; 358/434; 379/100.17
(58) Field of Search ................................ 358/400, 401, 358/405, 406, 425, 434, 435, 442, 467, 468; 370/471, 473, 469, 477, 468, 522, 535; 375/222

(56) References Cited

U.S. PATENT DOCUMENTS 5,307,174 A * 4/1994 Saito ..................... 379/100.17
5,488,653 A * 1/1996 Dimolitsas et al. ...... 379/100.17
5,657,134 A * 8/1997 Numata et al. .............. 358/425

* cited by examiner

Primary Examiner—Kimberly A. Williams
(74) Attorney, Agent, or Firm—Scully, Scott, Murphy & Presser

(57) ABSTRACT

A facsimile module self-diagnostic system is provided that can detect a failure occurring in the transmission-side demodulation circuit or in the reception-side re-modulation circuit in a facsimile module. A test facsimile signal generation circuit (10) is provided on the transmission side of the facsimile module. A test facsimile signal judgement circuit (25) is provided on the reception side of the facsimile module. In a test facsimile signal judgement zone, the test facsimile signal judgement circuit (25) inspects a test DCS (Digital Command Signal) signal at the first stage and inspects a test TCF (Training Check) signal at the second stage.

10 Claims, 7 Drawing Sheets

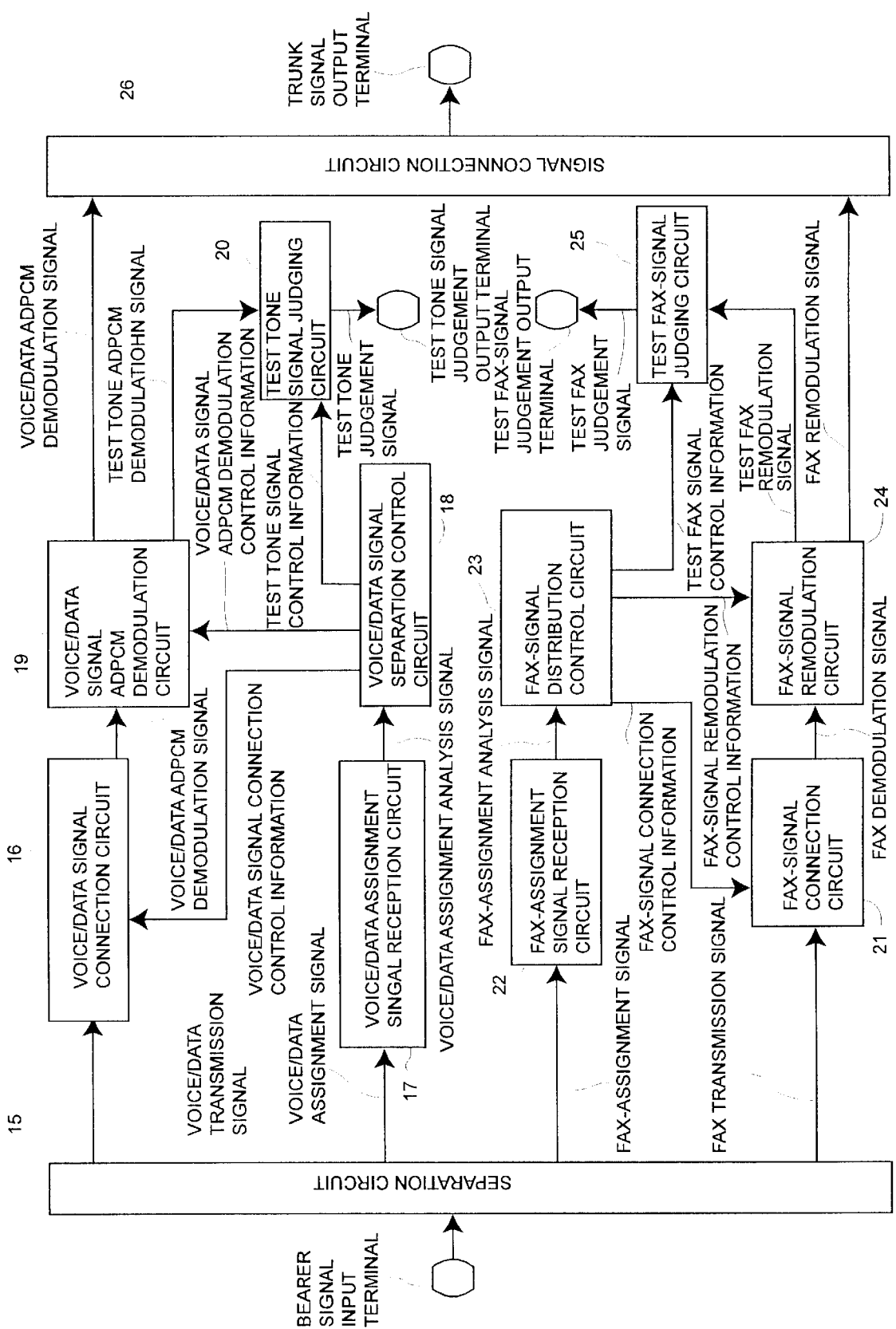

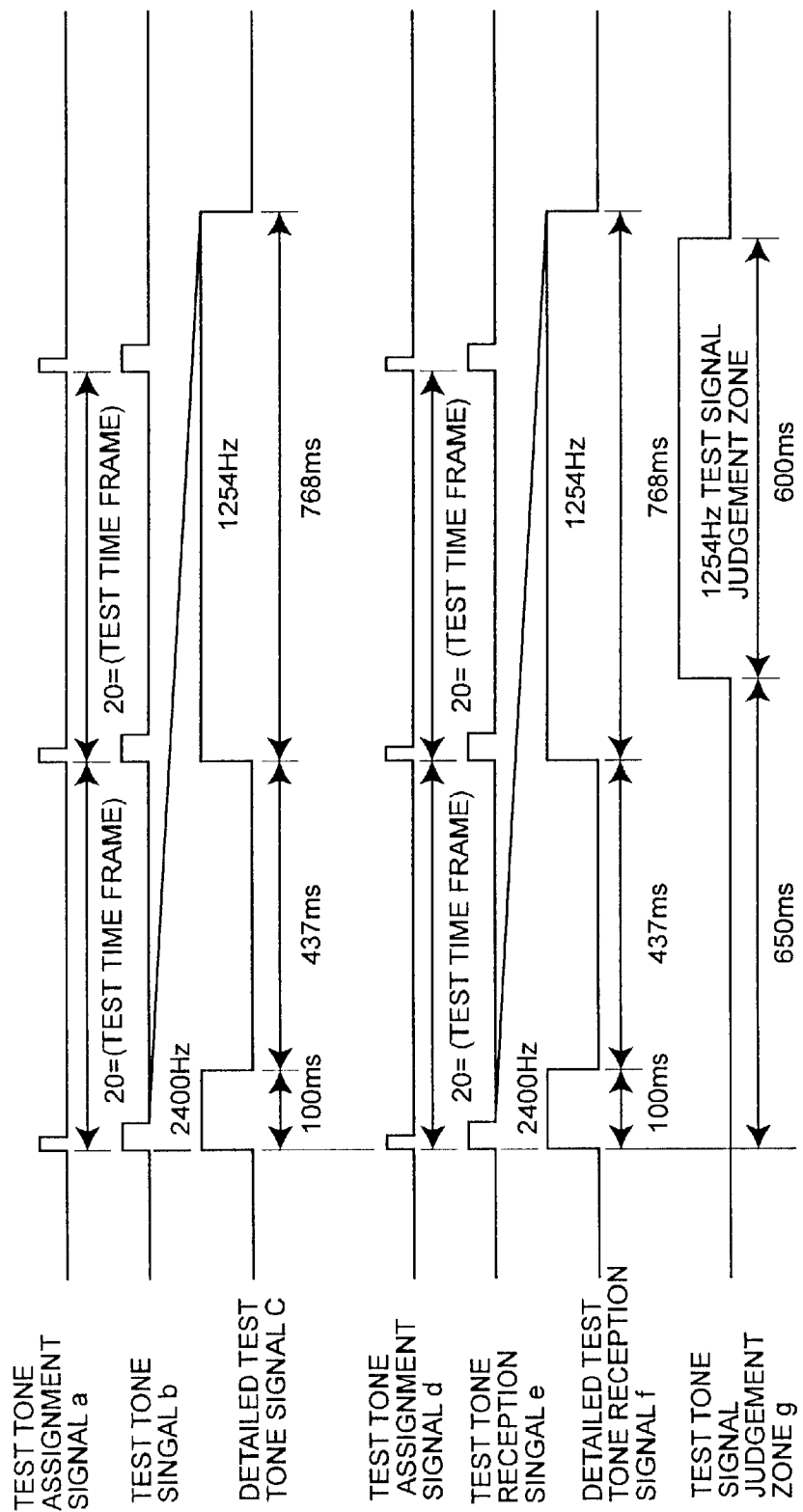

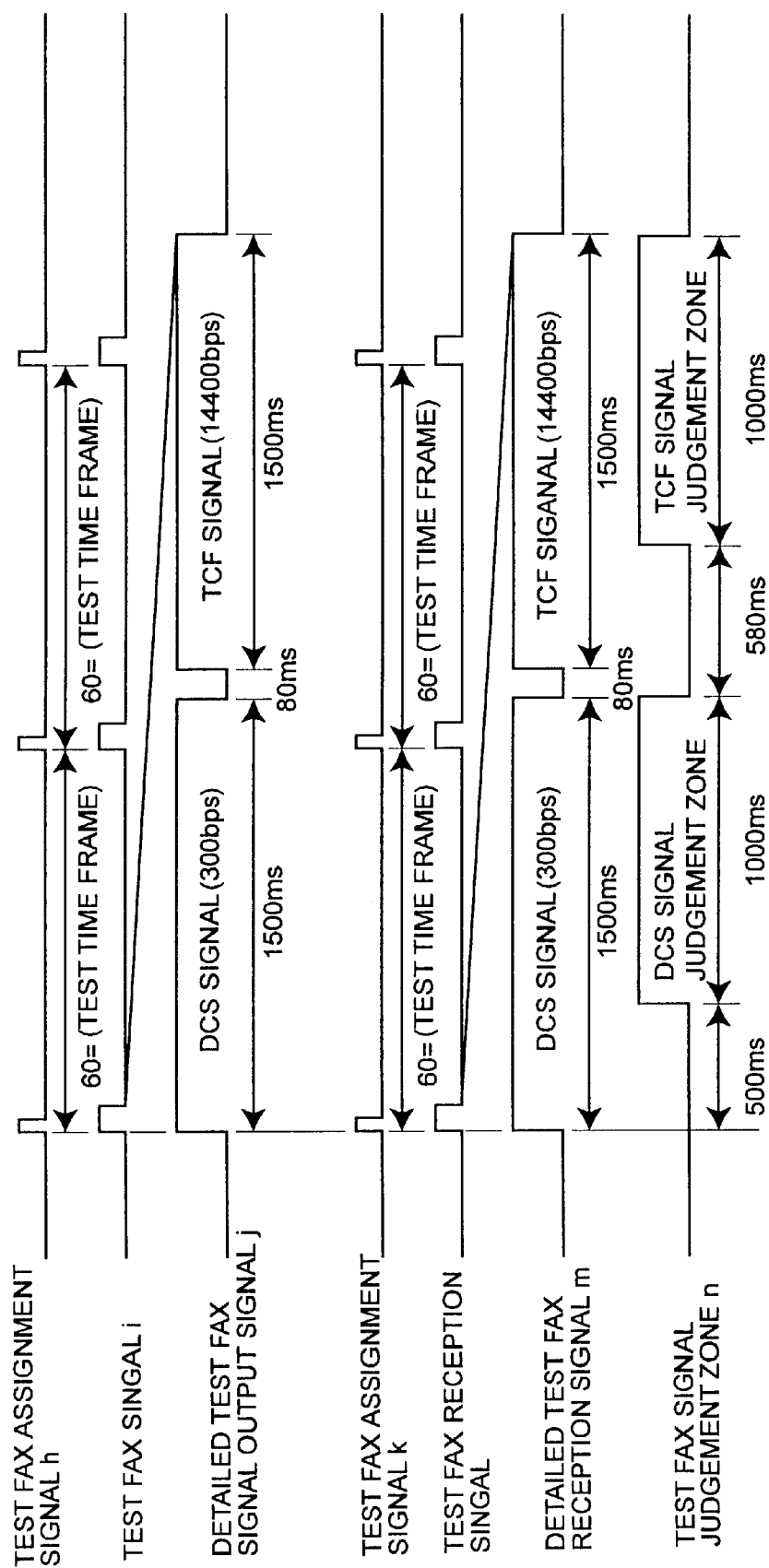

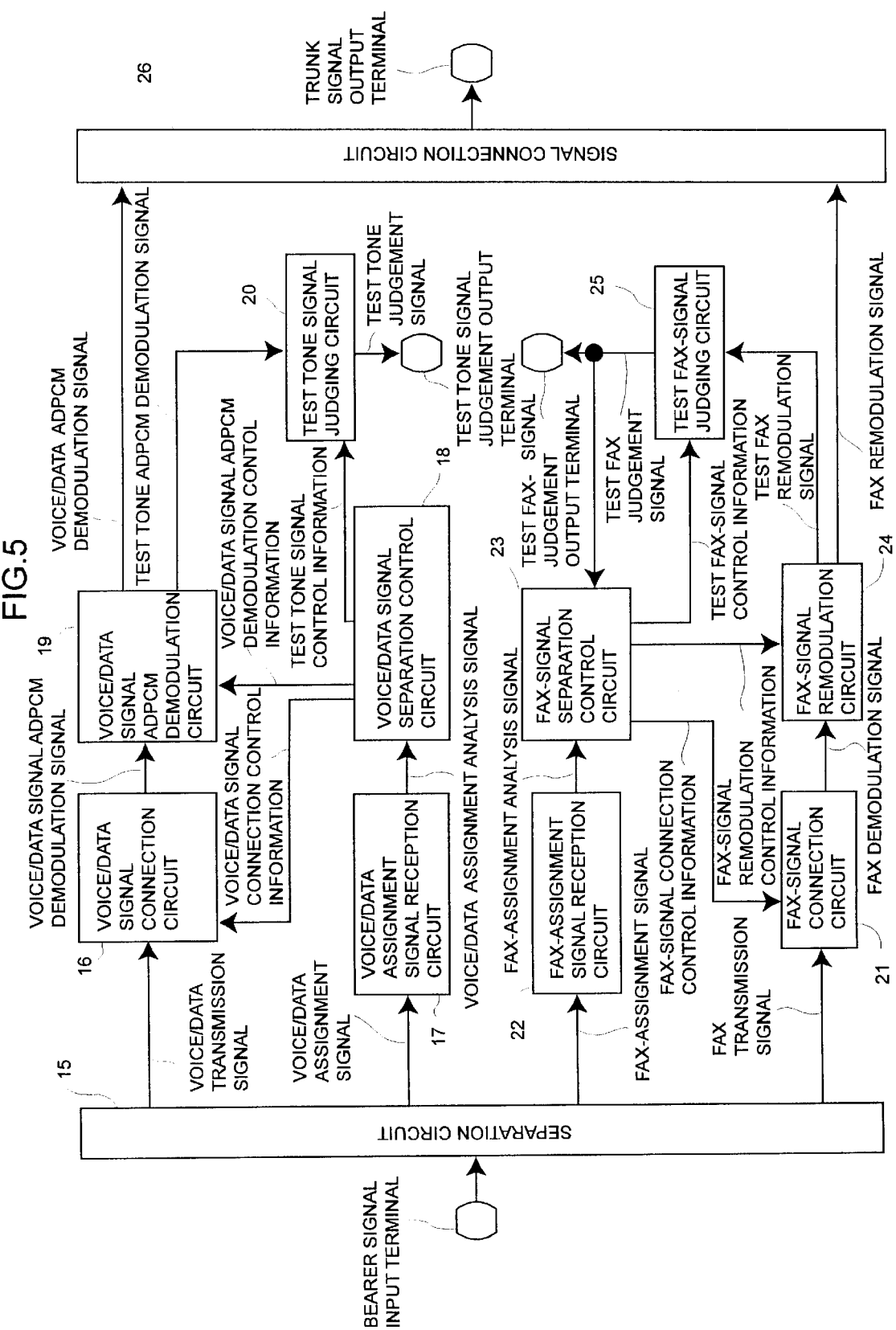

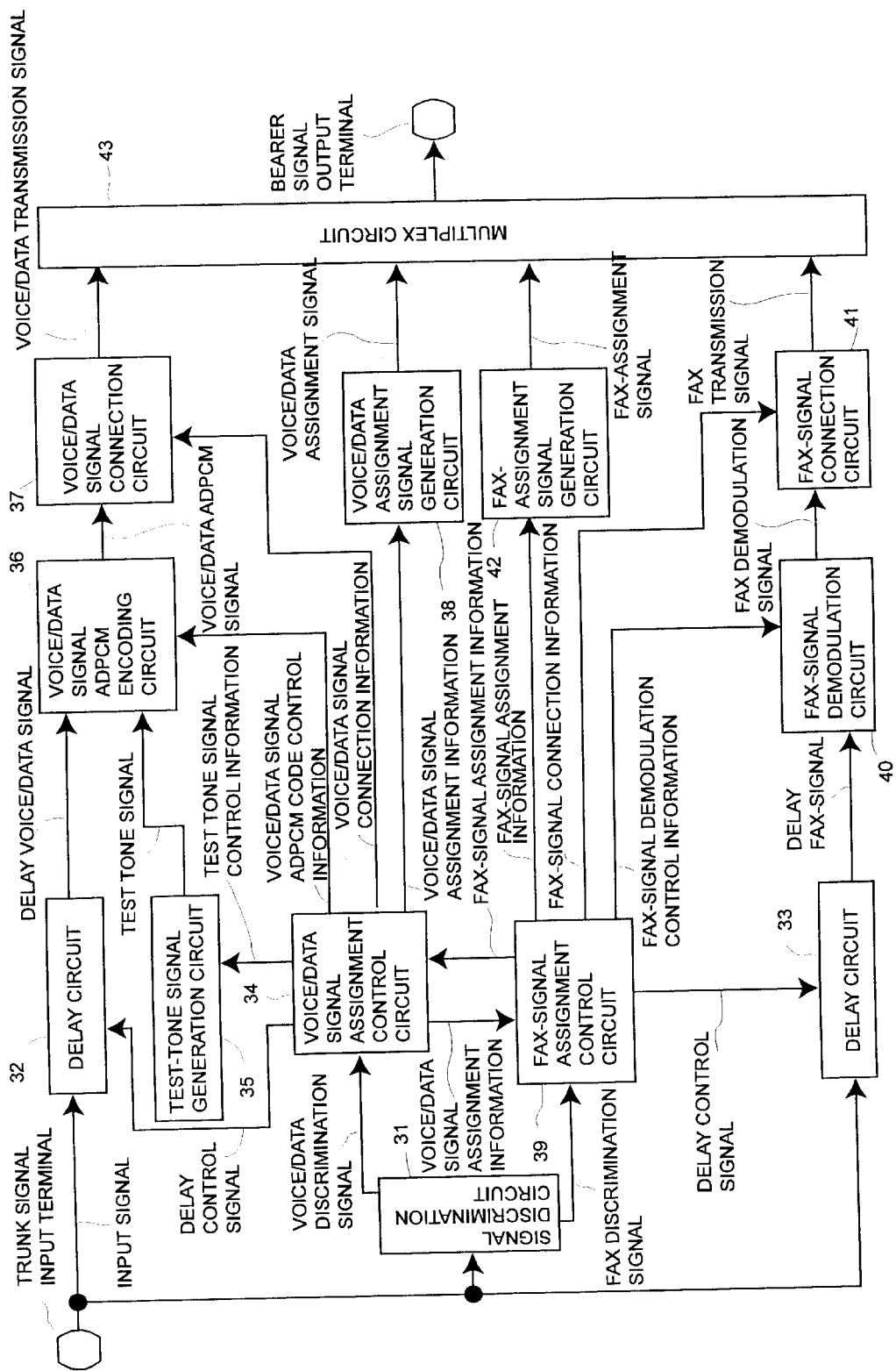

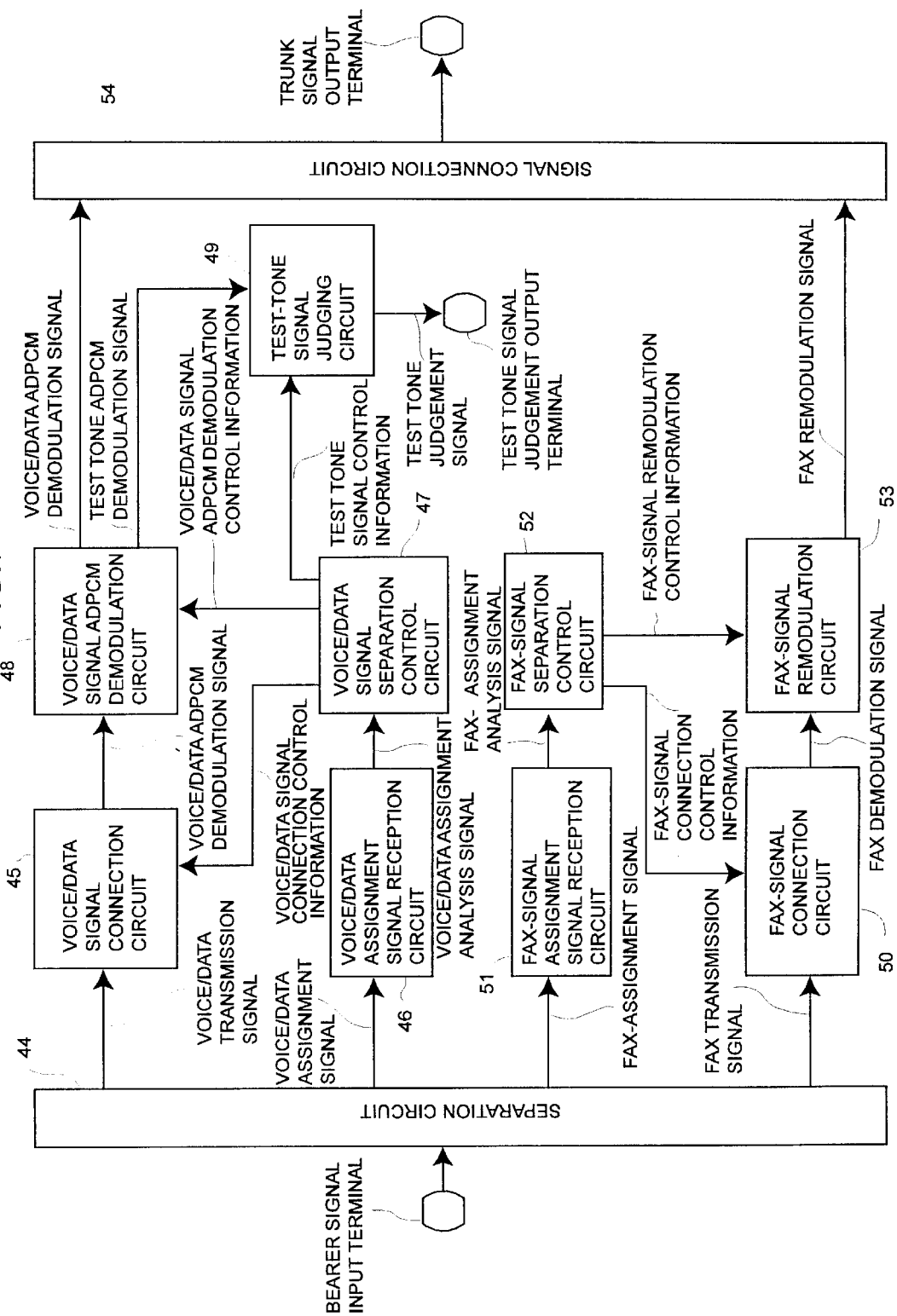

FACSIMILE MODULE SELF-DIAGNOSTIC SYSTEM FOR DIGITAL CIRCUIT MULTIPLICATION EQUIPMENT

BACKGROUND OF THE INVENTION

The present invention relates to a facsimile module self-diagnostic system which is suitable for digital circuit multiplication equipment (hereinafter often referred to as DCME) and can self-diagnose the demodulation circuit and the re-modulation circuit configuring a facsimile module built in the DCME.

The conventional self-diagnostic test for DCME is particularly performed to ensure the operation of the transmission-side adaptive differential pulse code modulation (hereinafter often referred to as ADPCM) encoding circuit and the reception-side ADPCM demodulation circuit, used for a compressed transmission process of voice signals and data signals.

Regarding such self-diagnostic testing, the section 10.1 "Channel check procedure" of ITU-T Recommendation G.763 "DIGITAL CIRCUIT MULTIPLICATION EQUIPMENT USING 32 KBIT/S ADPCM AND DIGITAL SPEECH INTERPORATION" specifies the method of ensuring the operation of a transmission-side adaptive differential pulse code modulation encoding circuit and a reception-side ADPCM demodulation circuit, used for a compressed transmission process of voice signals and data signals.

FIGS. 6 and 7 illustrate the procedure disclosed in the above-mentioned prior art document. FIG. 6 shows the configuration of the transmission-side self-diagnostic system in DCME. In the transmission circuit, a signal discrimination circuit 31 discriminates whether an input signal from the TRUNK input terminal is a data signal or a facsimile signal (hereinafter referred to a FAX signal). In response to the discriminated voice/data discrimination signal, a voice/data signal assignment control circuit 34 controls a delay circuit 32, a test tone signal generation circuit 35, a voice/data signal ADPCM encoding circuit 36, a voice/data signal connection circuit 37, and a voice/data assignment signal generation circuit 38 in an assignment mode. The delay circuit 32 delays an input signal by a period of time for discrimination and then outputs the delayed voice/data signal to the voice/data signal ADPCM encoding circuit 36. The test tone signal generation circuit 35 generates a test tone signal at regular intervals and outputs it to the voice/data signal ADPCM encoding circuit 36.

In the voice/data signal ADPCM encoding circuit 36, a corresponding ADPCM encoding circuit is assigned according to ADPCM code control information from the voice/data signal assignment control circuit 34. The corresponding ADPCM encoding circuit subjects a voice signal, a data signal or a test tone signal to an ADPCM encoding process and then outputs the encoded signal to the voice/data signal connection circuit 37. The voice/data signal connection circuit 37 rearranges ADPCM encoded voice/data signal for multiplication and outputs the rearranged signal as a voice/data transmission signal to the multiplex circuit 43. The voice/data assignment signal generation circuit 29 generates an assignment signal for informing the opposite side of voice/data assignment information and outputs it as the voice/data assignment signal to the multiplex circuit 43.

In response to a discriminated FAX discrimination signal, the FAX signal assignment control circuit 39 controls the delay circuit 33, the FAX signal demodulation circuit 40, the FAX signal connection circuit 41, and the FAX assignment signal generation circuit 42 in assignment mode. The delay circuit 33 delays an input signal by a period of time for discrimination and then outputs the delayed FAX signal to the FAX signal demodulation circuit 40. In the corresponding FAX signal demodulation circuit 40, a corresponding demodulation circuit is assigned according to demodulation control information from the FAX signal assignment control circuit 39. The corresponding modulation circuit demodulates the FAX signal or the test FAX signal and then outputs the demodulated signal to the FAX signal connection circuit 41. The FAX signal connection circuit 41 rearranges the demodulated FAX signal for demodulation and then outputs the rearranged signal as a FAX transmission signal to the multiplex circuit 43. The FAX assignment signal generation circuit 42 generates as a FAX assignment signal an assignment signal for informing the opposite side of FAX assignment information, to the multiplex circuit 43. The multiplex circuit 43 multiplexes a voice/data transmission signal, a voice/data assignment signal, a FAX transmission signal, and a FAX assignment signal and then outputs the multiplex signal as a BEARER signal to the opposite side.

FIG. 7 illustrates the configuration of a reception-side self-diagnostic system in the digital circuit. multiplication equipment. In the reception-side self-diagnostic system, the separation circuit 44 separates a voice/data transmission signal, a voice/data assignment signal, a FAX transmission signal and a FAX assignment signal from the input multiplex signal being a BEARER signal. The voice/data assignment signal reception circuit 46 analyses a separated voice/data assignment signal and then outputs a voice/data assignment analysis signal to the voice/data signal assignment control circuit 47.

The voice/data signal assignment control circuit 47 distributively controls the voice/data signal connection circuit 45, the voice/data signal ADPCM demodulation circuit 48 and the test tone signal judgment circuit 49. The voice/data signal connection circuit 4 rearranges separated voice/data signals for an ADPCM demodulation process and then outputs the rearranged signal to the voice/data signal ADPCM demodulation circuit 48. The voice/data signal ADPCM demodulation circuit 48 subjects a corresponding signal to the ADPCM demodulation process based on the ADPCM demodulation control information from the voice/data signal distribution control circuit 47. Then, the voice/data signal ADPCM demodulation circuit 48 outputs a demodulated voice signal and a demodulated data signal to the signal connection circuit 54 and outputs a demodulated test tone signal to the test tone signal Judgment circuit 49. The test tone signal demodulation judgment circuit 49 judges whether the ADPCM-demodulated test tone signal satisfies the recommendation and then outputs the judgement result.

The FAX assignment signal reception circuit 51 analyzes the separated FAX assignment signal and then outputs a FAX assignment analysis signal to the FAX signal separation control circuit 52. The FAX signal separation control circuit 52 distributively controls the FAX signal distribution control circuit 50 and the FAX signal re-modulation circuit 53. The FAX signal distribution control circuit 50 rearranges the separated FAX transmission signals for re-modulation by the re-modulator and then outputs the rearranged signal to the FAX signal re-modulation control circuit 52. The FAX signal re-modulation circuit 53 re-modulated a Corresponding signal based on the re-modulation control information from the FAX signal re-modulation circuit 52 and outputs the re-modulates the FAX signal to the signal connection circuit 54. The signal connection circuit 54 respectively connects a demodulated voice signal, a demodulated data signal, and a re-modulated FAX signal to respective TRUNK signal output terminals and outputs them as the TRUNK output signals.

As described above, the conventional self-diagnostic system does not have the configuration of ensuring the operation of the transmission-side demodulation circuit and the operation of the reception-side re-modulation circuit in the facsimile module used for a FAX signal compressed transmission process. Hence, the problem is that the self-diagnostic system cannot recognize a failure occurring in the transmission-side demodulation circuit and the reception-side re-modulation circuit in the facsimile module.

SUMMARY OF THE INVENTION

The present invention is made to solve the above-mentioned problems.

The objective of the invention is to provide a facsimile module self-diagnostic system that can ensure the operation of the transmission-side demodulation circuit and the reception-side re-modulation circuit in a facsimile module used for a compressed FAX-signal transmission process, thus detecting a failure occurring in those circuits. Moreover, another objective of the present invention is to provide a facsimile module self-diagnostic system suitable for DCME.

The objective of the present invention is achieved by facsimile module self-diagnostic system for digital circuit multiplication equipment (DCME), comprising a signal discrimination circuit provided on a transmission side, for discriminating whether an input signal is a voice/data signal or a facsimile signal; a de lay circuit for delaying said input signal by a period of time needed for discrimination; a test facsimile signal generation circuit for generating a test facsimile signal; a facsimile signal demodulation circuit for demodulating either a delayed facsimile signal output from the delay circuit or the test facsimile signal; a facsimile signal connection circuit for rearranging a facsimile signal demodulated by the facsimile signal demodulation circuit and then outputting the rearranged signal as a facsimile transmission signal or a test facsimile transmission signal; a facsimile assignment signal generation circuit for outputting a facsimile assignment signal, the facsimile assignment signal informing a reception side of assignment information on either a facsimile signal or a test facsimile signal; a facsimile signal assignment control circuit for controlling in assignment mode the delay circuit, the test facsimile signal generation circuit, the facsimile signal demodulation circuit, the facsimile signal connection circuit and the facsimile assignment signal generation circuit; a multiplex circuit for multiplexing either the facsimile transmission signal and the facsimile assignment signal or the test facsimile transmission signal and the test facsimile assignment signal, with a voice/data transmission signal and a voice/data assignment signal obtained based on the input signal; a separation circuit provided on a reception side, for separating either the facsimile transmission signal and the facsimile assignment signal or the test facsimile transmission signal and the facsimile assignment signal from a multiplex signal transmitted from the transmission side; a facsimile assignment signal reception circuit for receiving and analyzing the facsimile assignment signal or the test facsimile assignment signal; a facsimile signal connection circuit for rearranging the facsimile transmission signal or the test facsimile transmission signal and then outputting a facsimile demodulated signal; a facsimile re-modulation circuit for re-modulating the facsimile demodulated signal output from the facsimile signal connection circuit and then outputting a facsimile re-modulated signal or a test facsimile re-modulated signal; a test facsimile signal judgment circuit for receiving the test facsimile re-modulated signal from the facsimile signal re-modulation circuit and judging whether the test facsimile re-modulated signal is at a specified value; and a facsimile signal distribution control circuit for distributing control information to the facsimile signal connection circuit, the facsimile signal re-modulation circuit and the test facsimile signal judgment circuit.

In the facsimile module self-diagnostic system according to the present invention, the test facsimile signal, which is output from the test facsimile signal generation circuit, is a signal having a DCS signal zone, a silence zone and a TCF signal zone.

In the facsimile module self-diagnostic system according to the present invention, the test facsimile re-modulated signal includes a DCS signal and a TCF signal. The test facsimile signal judgment circuit inspects the test DCS signal in a DCS signal judgement zone subsequent to a predetermined waiting zone at a first stage and inspects the test TCF signal in a TCF signal judgement zone subsequent to a predetermined waiting zone at a second stage.

In the facsimile module self-diagnostic system according to the present invention, the facsimile distribution control circuit controls the operation of the facsimile re-modulation circuit based on a test facsimile signal judgement output from the test facsimile signal judgement circuit.

According to the present invention, a facsimile module self-diagnostic system on the transmission side for digital circuit multiplication equipment (DCME), comprises a delay circuit for delaying a voice/data signal or a facsimile signal by a period of time needed for discrimination; a test facsimile signal generation circuit for generating a test facsimile signal; a facsimile signal demodulation circuit for demodulating either a delayed facsimile signal output from the delay circuit or the test facsimile signal and then outputting a modulated facsimile signal to a facsimile signal connection circuit; and a facsimile signal assignment control circuit for controlling the delay circuit, the test facsimile signal generation circuit, and the facsimile signal demodulation circuit in assignment mode.

Moreover, according to the present invention, a facsimile module self-diagnostic system on the reception side for digital circuit multiplication equipment (DCME), comprises a facsimile re-modulation circuit for re-modulating a facsimile demodulated signal output then outputting a facsimile re-modulated signal or a test facsimile re-modulated signal; a test facsimile signal Judgment circuit for receiving the test facsimile re-modulated signal from the facsimile signal re-modulation circuit and judging whether the test facsimile re-modulated signal is at a specified value and then outputting a judgment signal; and a facsimile signal distribution control circuit for distributing control information to the facsimile signal re-modulation circuit and the test facsimile signal judgment circuit.

Furthermore, according to the present invention, a facsimile module self-diagnostic system on the reception side for digital circuit multiplication equipment (DCME), comprises a facsimile re-modulation circuit for re-modulating a facsimile demodulated signal output then outputting a facsimile re-modulated signal or a test facsimile re-modulated signal; a test facsimile signal judgment circuit for receiving said test facsimile re-modulated signal from the facsimile signal re-modulation circuit and judging whether the test facsimile re-modulated signal is at a specified value and then outputting a test facsimile signal judgment signal; and a facsimile signal distribution control circuit for distributing control information to the facsimile signal re-modulation circuit and the test facsimile signal judgment circuit; wherein the facsimile distribution control circuit controls the operation of the facsimile re-modulation circuit based on the test facsimile signal judgement output from the test facsimile signal judgement circuit.

BRIEF DESCRIPTION OF THE INVENTION

This and other objects, features, and advantages of the present invention will become more apparent upon a reading of the following detailed description and drawings, in which:

FIG. 2 is a block diagram illustrating a facsimile module self-diagnostic system on the reception side in digital circuit multiplication equipment, according to the embodiment of the present invention;

FIG. 3 is a timing chart showing signals at various blocks within the facsimile module self-diagnostic systems in FIGS. 1 and 2;

FIG. 4 is a timing chart showing signals at various blocks within the facsimile module self-diagnostic systems in FIGS. 1 and 2;

FIG. 5 is a block diagram illustrating a facsimile module self-diagnostic system on the transmission side in digital circuit multiplication equipment, according to another embodiment of the present invention;

FIG. 6 is a block diagram illustrating a conventional facsimile module self-diagnostic system on the transmission side in digital circuit multiplication equipment; and FIG. 7 is a block diagram illustrating a conventional facsimile module self-diagnostic system on the reception side in the digital circuit multiplication equipment.

DESCRIPTION OF THE EMBODIMENTS

Figure 1:
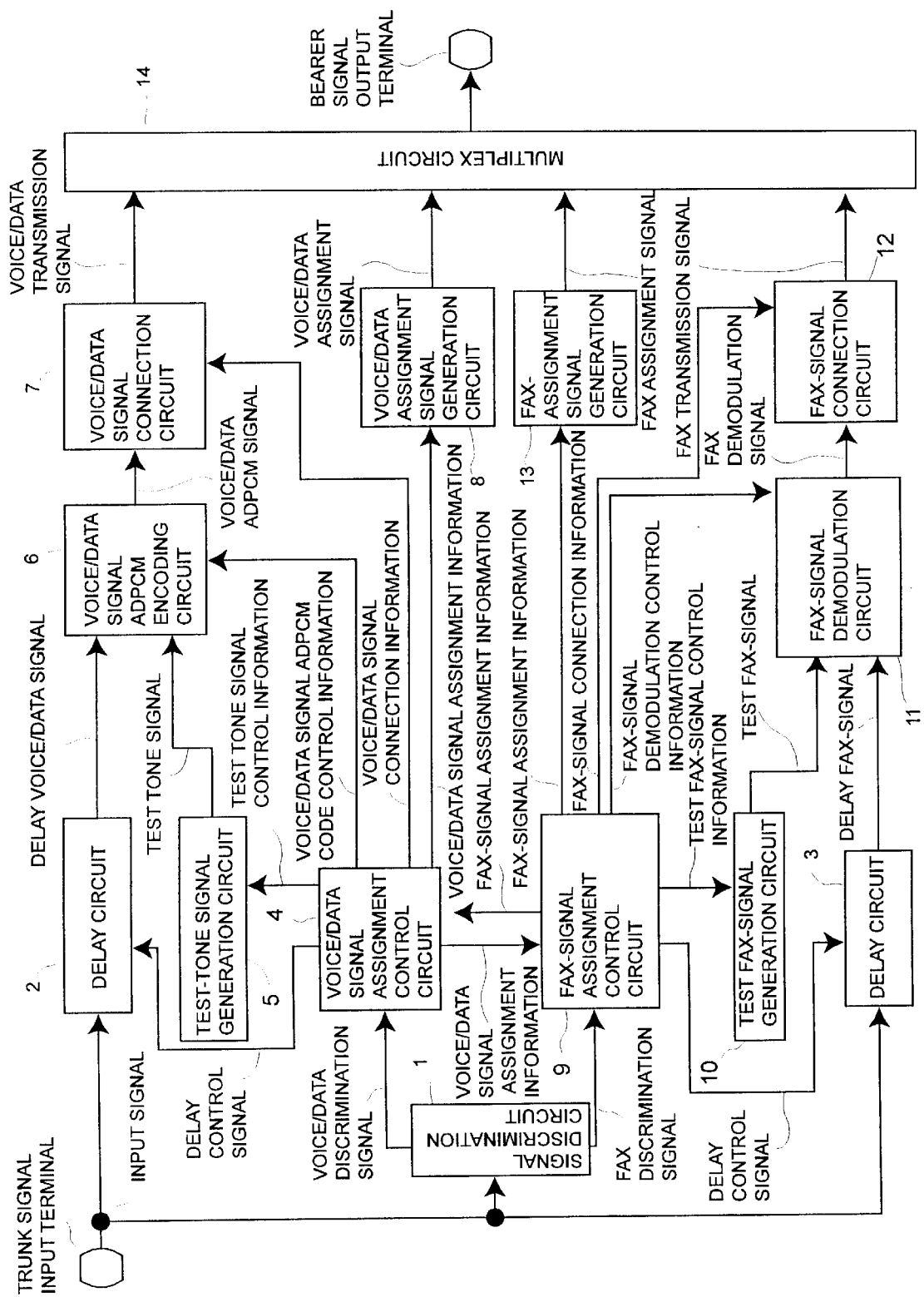
FIG. 1 is a block diagram illustrating a facsimile module self-diagnostic system on the transmission side in digital circuit multiplication equipment, according to an embodiment of the present invention.

Embodiments of the present invention will be described below with reference to the attached drawings.

FIG. 1 illustrates the configuration of a facsimile module self-diagnostic system on the transmission side in DCME, according to the present invention. In this configuration, a signal discrimination circuit 1 discriminated input signals, that is, a voice signal, a data signal and a FAX signal, received via the TRUNK input terminal. A voice/data signal assignment control circuit 4 receives a voice/data discrimination signal. Thus, the voice/data signal assignment control circuit 4 controls a test tone signal generation circuit 5, a voice/data signal ADPCM encoding circuit 6, a voice/data signal connection circuit 7 and a voice/data assignment signal generation circuit 8 in an assignment mode.

The delay circuit 2 delays an input signal by a desired period of time and then outputs the delayed signal as a delayed voice/data signal to the voice/data signal ADPCM encoding circuit 6. The test tone signal generation circuit 5 generates test tone signals at constant intervals and then outputs them to the voice/data signal ADPCM encoding circuit 6. In the corresponding voice/data signal ADPCM encoding circuit 6, a corresponding ADPCM encoding circuit is assigned according to voice/data signal ADPCM code control information from the voice/data signal assignment control circuit 4. The corresponding ADPCM encoding circuit 6 executes an ADPCM encoding process of voice signals, data signals, or test tone signals and then generates the resultant signals to the voice/data signal connection circuit 7. The voice/data signal connection circuit 7 rearranges the ADPCM-encoded voice/data signal or test tone signal and then outputs a voice/data transmission signal to the multiplex circuit 14. The voice/data assignment signal generation circuit 8 generates assignment signals for informing the opposite side of voice/data assignment information and then outputs a voice/data assignment signal to the multiplex circuit 14.

The FAX signal assignment control circuit 9 receives the FAX discrimination signal discriminated by the signal discrimination circuit 1. Thus the FAX signal assignment control circuit 9 subjects the delay circuit 3, the test FAX signal generation circuit 10, the FAX signal demodulation circuit 11, the FAX signal connection circuit 12 and the FAX assignment signal generation circuit 13 to assignment control. The delay circuit 3 delays the input signal by a necessary period of time for discrimination and outputs the delayed PAX signal to the FAX signal demodulation circuit 11. The test FAX signal generation circuit 10 generates test FAX signals to the FAX signal demodulation circuit 11 at regular intervals. In the FAX signal demodulation circuit 11, a corresponding demodulation circuit is assigned according to the demodulation control information from the FAX signal assignment control circuit 9 and demodulates the FAX signal or the test FAX signal, thus outputting the demodulated signal to the FAX signal connection circuit 12.

The FAX signal connection circuit 12 rearranges the demodulated FAX signal and then outputs the rearranged signal as a FAX transmission signal to the multiplex circuit 14. The FAX assignment signal generation circuit 13 generates an assignment signal for informing the opposite side of assignment information regarding the FAX signal or the test FAX signal and then outputs the FAX assignment signal to the multiplex circuit 14. The multiplex circuit 14 multiplexes the voice/data transmission signal, the voice/data assignment signal, the FAX transmission signal, and the FAX assignment signal and then outputs the multiplexed signal as the BEARER signal to the opposite side. The delay circuit 3, the FAX signal assignment control circuit 9, the test FAX signal generation circuit 10, the FAX signal demodulation circuit 11, the FAX signal connection circuit 12 and the FAX assignment signal generation circuit 13 configure a transmission-side facsimile module.

FIG. 2 illustrates the reception-side configuration of the facsimile module self-diagnostic system in the DCME, according to the present invention. In the reception side of the DCME, the separation circuit 15 separates the input multiplex signal being the BEARER signal into a voice/data transmission signal, a voice/data assignment signal, a FAX transmission signal and a FAX assignment signal. The voice/data assignment signal reception circuit 17 analyzes the separated voice/data assignment signal and outputs it as a voice/data assignment analysis signal to the voice/data signal distribution control circuit 18.

The voice/data signal distribution control circuit 18 subjects the voice/data signal connection circuit 16, the voice/data signal ADPCM demodulation circuit 19, the test tone signal Judgement circuit 20 to distribution control. The voice/data signal connection circuit 16 rearranges the separated voice/data transmission signal to perform the ADPCM demodulation process. The rearranged signal is output to the ADPCM demodulation circuit 19. The voice/data signal ADPCM demodulation circuit 19 subjects corresponding signals to the ADPCM demodulation process based on ADPCM demodulation control information from the voice/data signal distribution control circuit 18. Then the voice/data signal ADPCM demodulation circuit 19 outputs the demodulated test tone signal and the data signal to the signal connection circuit 26 and outputs the demodulated voice signal and the data signal to the test tone signal judgement circuit 20. The test tone signal judgement circuit 20 judges whether the test tone signal ADPCM-demodulated satisfies requirements and then outputs the decision result.

The FAX assignment signal reception circuit 22 analyzes the separated FAX assignment signal and then outputs a FAX assignment analysis signal to the FAX signal distribution control circuit 23. The FAX signal distribution control circuit 23 distributively controls the FAX signal connection circuit 21, the FAX signal re-modulation circuit 24, and the test FAX signal judgment circuit 25. The FAX signal connection circuit 21 rearranges the separated FAX transmission signal to re-modulate by the re-modulator and then outputs the rearranged signal to the FAX signal re-modulation circuit 24.

The FAX signal re-modulation circuit 24 re-modulates kilo corresponding signals based on the re-modulation control information from the FAX signal distribution control circuit 23. Then the FAX signal re-modulation circuit 24 outputs the re-modulated FAX signal to the test FAX signal judgement output terminal and outputs the re-modulated test FAX signal to the test FAX signal judgement circuit 25. The test FAX signal judgement circuit 25 judges whether the re-modulated test FAX signal satisfies the requirements and then outputs the decision result to the test FAX signal judgement output terminal. The signal connection circuit 26 outputs the demodulated voice signal, the demodulated data signal and the re-modulated FAX signal, each as a TRUNK signal, via the corresponding TRUNK signal output terminals. The FAX assignment reception circuit 22, the FAX signal connection circuit 21, the FAX signal distribution control circuit 23, the FAX signal re-modulation circuit 24 and the test FAX signal judgement circuit configures a reception-side facsimile module.

Next, a test tone signal transmission/reception operation will be described using the timing chart of FIG. 3. The voice/data signal assignment control circuit 4 controls the delay circuit 2, the test tone signal generation circuit 5, the voice/data ADPCM encoding circuit 6, the voice/data signal connection circuit 7, and the voice/data assignment signal generation circuit 8 in an assignment mode. The voice/data assignment signal generation circuit 8 outputs the test tone assignment signal (a) based on voice/data signal assignment information from the voice/data signal assignment control circuit 4. The test tone signal generation circuit 5 outputs the test tone signal (b) at regular intervals (e.g. a test time fra me of 20 seconds specified in ITU-T G.763), based on test tone signal control information from the voice/data signal assignment control circuit 4.

The detailed test tone signal output c includes a 2400 Hz signal zone of −10 dBm0 with a duration of 100 ms, a silence zone with a duration of 437 ms, and a 1254 Hz test signal zone of −0 dBm0 with a duration of 768 ms. The test tone signal b is ADPCM-encoded by an unused voice/data signal ADPCM encoding circuit 6. The voice/data signal connection circuit 7 rearranges the ADPCM-encoded test tone signal and then supplies it as a voice/data transmission signal to the multiplex circuit 14. The multiplex circuit 14 multiplexes the voice/data transmission signal, the voice/data assignment signal, the FAX transmission signal, and the FAX assignment signal and then outputs the resultant signal as the BEARER signal to the opposite side.

The separation circuit 15 separates the BEARER signal from the opposite side into a voice/data transmission signal, a voice/data assignment signal, a FAX transmission signal and a FAX assignment signal. The voice/data assignment signal reception circuit 17 analyses the separated voice/data assignment signal and then outputs the test tone assignment signal d to the voice/data signal distribution control circuit 18. The voice/data signal distribution control circuit 18 distributively controls the voice/data signal connection circuit 16, the voice/data signal ADPCM demodulation circuit 19 and the test tone signal judgement circuit 20 by the analyzed voice/data assignment signal.

The voice/data signal connection circuit 16 rearranges the separated voice/data transmission signal and then outputs a test tone signal to an unused voice/data signal ADPCM demodulation circuit 19. The voice/data signal ADPCM demodulation circuit 19 subjects the test tone signal to an ADPCM demodulation process and then outputs the resultant signal as the test tone reception signal e to the test tone signal judgement circuit 20. The detailed test tone reception signal f includes a 2400 Hz signal zone of −10 dBm0 with a duration of 100 ms, a silence zone with a duration of 437 ms, and a 1254 Hz test signal zone of −0 dBm0 with a duration of 768 ms. The test tone signal judgement circuit 20 inspects the 1254 Hz test signal with a period of 600 ms after a wait time of 650 ms from the reception time of the test tone assignment signal d, in the detailed test tone reception signal f and the test tone signal judgment zone g. Then, the test tone signal judgement circuit 20 produces the decision result as a test tone signal judgement output signal.

Similarly, the test FAX signal transmission/reception operation is performed according to the timing chart shown in FIG. 4. The FAX signal assignment control circuit 9 distributively controls the delay circuit 3, the test FAX signal generation circuit 10, the FAX signal demodulation circuit 11, the FAX signal connection circuit 12, and the FAX assignment signal generation circuit 13. The FAX assignment signal generation circuit 13 outputs the test FAX assignment signal h based on FAX signal assignment information from the FAX signal assignment control circuit 13. The test FAX signal generation circuit 10 outputs the test FAX signal i at regular intervals (e.g. with a test time frame set to 60 seconds) based on test FAX signal control information from the FAX signal assignment control circuit 9.

The detailed test FAX signal j includes a digital command signal (hereinafter referred to ds DCS) zone of 300 bps of −20 dBm with a duration of 1500 ms, a silence zone with a duration of 80 ms, and a training check (hereinafter referred to as TCF) of 14400 bps of −20 dBm with a duration of 1500 ms. The test FAX signal i is demodulated by an unused FAX signal demodulation circuit 11. The FAX signal connection circuit 12 rearranges the demodulated test FAX signal and then outputs the rearranged signal as a FAX transmission signal to the multiplex circuit 14. The multiplex circuit 14 multiplexes the FAX transmission signal and the FAX assignment signal and then outputs the multiplexed signal as the BEARER signal to the opposite side.

The separation circuit 15 separates the BEARER signal from the opposite side into the voice/data transmission signal, the voice/data assignment signal, the FAX transmission signal, and the FAX assignment signal. The FAX assignment signal reception circuit 22 analyzes the separated FAX assignment signal and then outputs the test FAX assignment signal k to the FAX signal assignment control circuit 23. The FAX signal assignment control circuit 23 distributively controls the FAX signal connection circuit 21, the FAX signal re-modulation circuit 24, and the test FAX signal judgement circuit 25 according to the analyzed FAX assignment signal. The FAX signal connection circuit 21 rearranges the separated FAX transmission signal and then outputs a test FAX signal to an unused FAX signal re-modulation circuit 24. The FAX signal re-modulation circuit 24 re-modulates the test FAX signal and then outputs the resultant signal as the test FAX reception signal 1 to the test FAX signal judgement circuit 25. The detailed test FAX reception signal i includes a DCS signal zone of 300 bps of −20 dBm0 with a duration of 1500 ms, a silence zone with a duration of 80 ms, and a TCF signal zone of 14400 bps of −20 dBm0 with a duration of 1500 ms.

With the detailed test FAX reception signal m from the reception time of the test FAX assignment signal k and the test PAX signal judgement duration n, the test FAX signal judgement circuit 25 Judges a test DCS signal for a period of 1000 ms after a wait time of 500 ms (first stage) and judges a test TCF signal for a duration of 1000 ms after a wait time of 580 ms (second stage). Then, test FAX signal judgement circuit 25 outputs the judgement result as a test FAX signal judgement output.

FIG. 5 shows another embodiment of the reception circuit according to the present invention. The operation of the demodulation circuit and the re-modulated circuit in the facsimile module after the self-diagnostic judgment is further devised in this embodiment. That is, the test FAX signal judgement circuit 25 outputs the test FAX signal decision result to the FAX signal distribution control circuit 23. Thus, this embodiment can set the defective re-modulation circuit so as not to use it in the normal FAX signal distribution control process. This embodiment has a new advantage in that an abnormal re-modulation circuit found through the self-diagnosis of the facsimile module in DCME can be rejected in usage.

As described above, according to the present invention, the DCME includes a transmission-side facsimile module having a test FAX signal generation circuit and a reception-side facsimile module having a test FAX signal generation circuit. This configuration can self-diagnose the demodulation circuit within the transmission-side facsimile module and the re-modulation circuit Within the reception-side facsimile module. This self-diagnostic capability allows a failure of the demodulation circuit or the re-modulation circuit to be certainly detected. Moreover, when the test FAX signal judgement circuit detect s an abnormal state of the re-modulation circuit, It can be avoided using the failed re-modulation circuit.

The entire disclosure of Japanese Application No. 10-181133 filed Jun. 26, 1998 including specification, claims, drawing and summary are incorporated herein by reference in its entirely.

What is claimed is:

1. A facsimile module self-diagnostic system for digital circuit multiplication equipment (DCME), comprising:
    a signal discrimination circuit provided on a transmission side, for discriminating whether an input signal is a voice/data signal or a facsimile signal;
    a delay circuit for delaying said input signal by a period of time needed for discrimination;
    a test facsimile signal generation circuit for generating a test facsimile signal;
    a facsimile signal demodulation circuit for demodulating either a delayed facsimile signal output from said delay circuit or said test facsimile signal;
    a facsimile signal connection circuit for rearranging a facsimile signal demodulated by said facsimile signal demodulation circuit and then outputting the rearranged signal as a facsimile transmission signal or a test facsimile transmission signal;
    a facsimile assignment signal generation circuit for outputting a facsimile assignment signal, said facsimile assignment signal informing a reception side of assignment information on either a facsimile signal or a test facsimile signal;
    a facsimile signal assignment control circuit for controlling in assignment mode said delay circuit, said test facsimile signal generation circuit, said facsimile signal demodulation circuit, said facsimile signal connection circuit and said facsimile assignment signal generation circuit;
    a multiplex circuit for multiplexing either said facsimile transmission signal and said facsimile assignment signal or said test facsimile transmission signal and said test facsimile assignment signal, with a voice/data transmission signal and a voice/data assignment signal obtained based on said input signal;
    a separation circuit provided on a reception side, for separating either said facsimile transmission signal and said facsimile assignment signal or said test facsimile transmission signal and said facsimile assignment signal from a multiplex signal transmitted from said transmission side;
    a facsimile assignment signal reception circuit for receiving and analyzing said facsimile assignment signal or said test facsimile assignment signal;
    a facsimile signal connection circuit for rearranging said facsimile transmission signal or said test facsimile transmission signal and then outputting a facsimile demodulated signal;
    a facsimile re-modulation circuit for re-modulating said facsimile demodulated signal output from said facsimile signal connection circuit and then outputting a facsimile re-modulated signal or a test facsimile re-modulated signal;
    a test facsimile signal judgment circuit for receiving said test facsimile re-modulated signal from said facsimile signal re-modulation circuit and judging whether said test facsimile re-modulated signal is at a specified value; and
    a facsimile signal distribution control circuit for distributing control information to said facsimile signal connection circuit, said facsimile signal re-modulation circuit and said test facsimile signal judgment circuit.

2. The facsimile module self-diagnostic system defined in claim 1, wherein said test facsimile signal, which is out from said test facsimile signal generation circuit, is a signal having a DCS signal zone, a silence zone and a TCF signal zone.

3. The facsimile module self-diagnostic system defined in claim 1, wherein said test facsimile re-modulated signal includes a DCS signal and a TCF signal; and wherein said test facsimile signal judgment circuit inspects said test DCS signal in a DCS signal judgement zone subsequent to a predetermined waiting zone at a first stage and inspects said test TCF signal in a TCF signal judgement zone subsequent to a predetermined waiting zone at a second stage.

4. The facsimile module self-diagnostic system defined in claim 1, wherein said facsimile distribution control circuit controls the operation of said facsimile re-modulation circuit based on a test facsimile signal judgement output from said test facsimile signal judgement circuit.

5. A facsimile module self-diagnostic system on the transmission side for digital circuit multiplication equipment (DCME), comprising:

a delay circuit for delaying a voice/data signal or a facsimile signal by a period of time needed for discrimination;

a test facsimile signal generation circuit for generating a test facsimile signal;

a facsimile signal demodulation circuit for demodulating either a delayed facsimile signal output from said delay circuit or said test facsimile signal and then outputting a modulated facsimile signal to a facsimile signal connection circuit; and a facsimile signal assignment control circuit for controlling said delay circuit, said test facsimile signal generation circuit, and said facsimile signal demodulation circuit in assignment mode.

6. The facsimile module self-diagnostic system defined in claim 5, wherein said test facsimile signal, which is output from said test facsimile signal generation circuit, is a signal having a DCS signal zone, a silence zone and a TCF signal zone.

7. A facsimile module self-diagnostic system on the reception side for digital circuit multiplication equipment (DCME), comprising:

a facsimile re-modulation circuit for re-modulating a facsimile demodulated signal output then outputting a facsimile re-modulated signal or a test facsimile re-modulated signal;

a test facsimile signal judgment circuit for receiving said test facsimile re-modulated signal from said facsimile signal re-modulation circuit and judging whether said test facsimile re-modulated signal is at a specified value and then outputting a judgment signal; and a facsimile signal distribution control circuit for distributing control information to said facsimile signal re-modulation circuit and said test facsimile signal judgment circuit.

8. The facsimile module self-diagnostic system defined in claim 7, wherein said test facsimile signal, which is output from said test facsimile signal generation circuit, is a signal having a DCS signal zone, a silence zone and a TCF signal zone.

9. A facsimile module self-diagnostic system on the reception side for digital circuit multiplication equipment (DCME), comprising:

a facsimile re-modulation circuit for re-modulating a facsimile demodulated signal output then outputting a facsimile re-modulated signal or a test facsimile re-modulated signal;

a test facsimile signal judgment circuit for receiving said test facsimile re-modulated signal from said facsimile signal re-modulation circuit and judging whether said test facsimile re-modulated signal is at a specified value and then outputting a test facsimile signal judgment signal; and a facsimile signal distribution control circuit for distributing control information to said facsimile signal re-modulation circuit and said test facsimile signal judgment circuit;

wherein said facsimile distribution control circuit controls the operation of said facsimile re-modulation circuit based on said test facsimile signal judgement output from said test facsimile signal judgement circuit.

10. The facsimile module self-diagnostic system defined in claim 9, wherein said test facsimile signal, which is output from said test facsimile signal generation circuit, is a signal having a DCS signal zone, a silence zone and a TCF signal zone.

\* \* \* \* \*